United States Patent
Hayashi

(10) Patent No.: US 11,614,144 B2
(45) Date of Patent: Mar. 28, 2023

(54) TRANSMISSION BELT AND SYSTEM FOR OBTAINING TRANSMISSION BELT STATUS INFORMATION

(71) Applicant: Mitsuboshi Belting Ltd., Kobe (JP)

(72) Inventor: Shigehiko Hayashi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 314 days.

(21) Appl. No.: 16/769,727

(22) PCT Filed: Dec. 19, 2018

(86) PCT No.: PCT/JP2018/046847
§ 371 (c)(1),
(2) Date: Jun. 4, 2020

(87) PCT Pub. No.: WO2019/124457
PCT Pub. Date: Jun. 27, 2019

(65) Prior Publication Data
US 2021/0172497 A1   Jun. 10, 2021

(30) Foreign Application Priority Data

Dec. 19, 2017 (JP) .............................. JP2017-242968
Dec. 20, 2017 (JP) .............................. JP2017-243510
Dec. 12, 2018 (JP) .............................. JP2018-232408

(51) Int. Cl.
*F16G 5/20* (2006.01)
*F16G 5/06* (2006.01)
*G01L 5/101* (2020.01)

(52) U.S. Cl.
CPC ............... *F16G 5/20* (2013.01); *F16G 5/06* (2013.01); *G01L 5/101* (2013.01)

(58) Field of Classification Search
CPC ............... F16G 5/06; F16G 1/00; G01L 5/101
See application file for complete search history.

(56) References Cited

U.S. PATENT DOCUMENTS

| 2007/0107505 A1 | 5/2007 | Schillinger et al. |
| 2007/0256485 A1 | 11/2007 | Rensel et al. |
| 2009/0277262 A1* | 11/2009 | Rensel .................. B60C 11/246 73/146 |

(Continued)

FOREIGN PATENT DOCUMENTS

| CN | 101443644 A | 5/2009 |
| CN | 104395640 A | 3/2015 |

(Continued)

OTHER PUBLICATIONS

DE102009003732 translation Oct. 7, 2010 (Year: 2010).*

(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

A power transmission belt includes a stacked body including a back surface layer disposed on a back surface side, an inner surface layer disposed on an inner surface side, and a tension member layer containing a tension member embedded between the back surface layer and the inner surface layer, in which the power transmission belt includes a sensor configured to detect a status of the power transmission belt, as at least a part of the stacked body.

13 Claims, 9 Drawing Sheets

(56) References Cited

U.S. PATENT DOCUMENTS

| | | |
|---|---|---|
| 2009/0303065 A1 | 12/2009 | Lipowski |
| 2011/0074564 A1* | 3/2011 | Hirabayashi .......... H01L 41/113 340/447 |
| 2011/0083500 A1 | 4/2011 | Rensel et al. |
| 2012/0323371 A1* | 12/2012 | Ballhausen ............... F16G 1/28 700/275 |
| 2014/0068904 A1* | 3/2014 | Ebigase ............. H01L 41/1876 29/25.35 |
| 2015/0135845 A1 | 5/2015 | Hermey et al. |
| 2017/0254405 A1 | 9/2017 | Ballhausen |
| 2021/0102602 A1 | 4/2021 | Sattler et al. |

FOREIGN PATENT DOCUMENTS

| | | |
|---|---|---|
| DE | 10036014 A1 | 2/2002 |
| DE | 102009003732 A1 | 10/2010 |
| EP | 2275286 A1 | 1/2011 |
| EP | 3615320 B1 | 4/2021 |
| JP | 2007-514176 A | 5/2007 |
| JP | 5632519 B2 | 11/2014 |
| WO | 2016-138285 A1 | 9/2016 |

OTHER PUBLICATIONS

Apr. 1, 2021—(CN) Notification of First Office Action—App 201880081251.3, Eng Tran.
Mar. 12, 2019—International Search Report—Intl App PCT/JP2018/046847.
Oct. 15, 2021—(EP) Extended Search Report—App 18891182.0.
Aug. 17, 2021—(CN) Notification of Second Office Action—App 201880081251.3, Eng Tran.
"Introduction to Wireless Sensor Network Technology", Yunbo Shi, p. 277, XIDIAN University Press, Sep. 2017 [English translation not available—for relevance see reference to citation D3 in Aug. 17, 2021—(CN) Notification of Second Office Action—App 201880081251.3].

* cited by examiner

[FIG. 1]
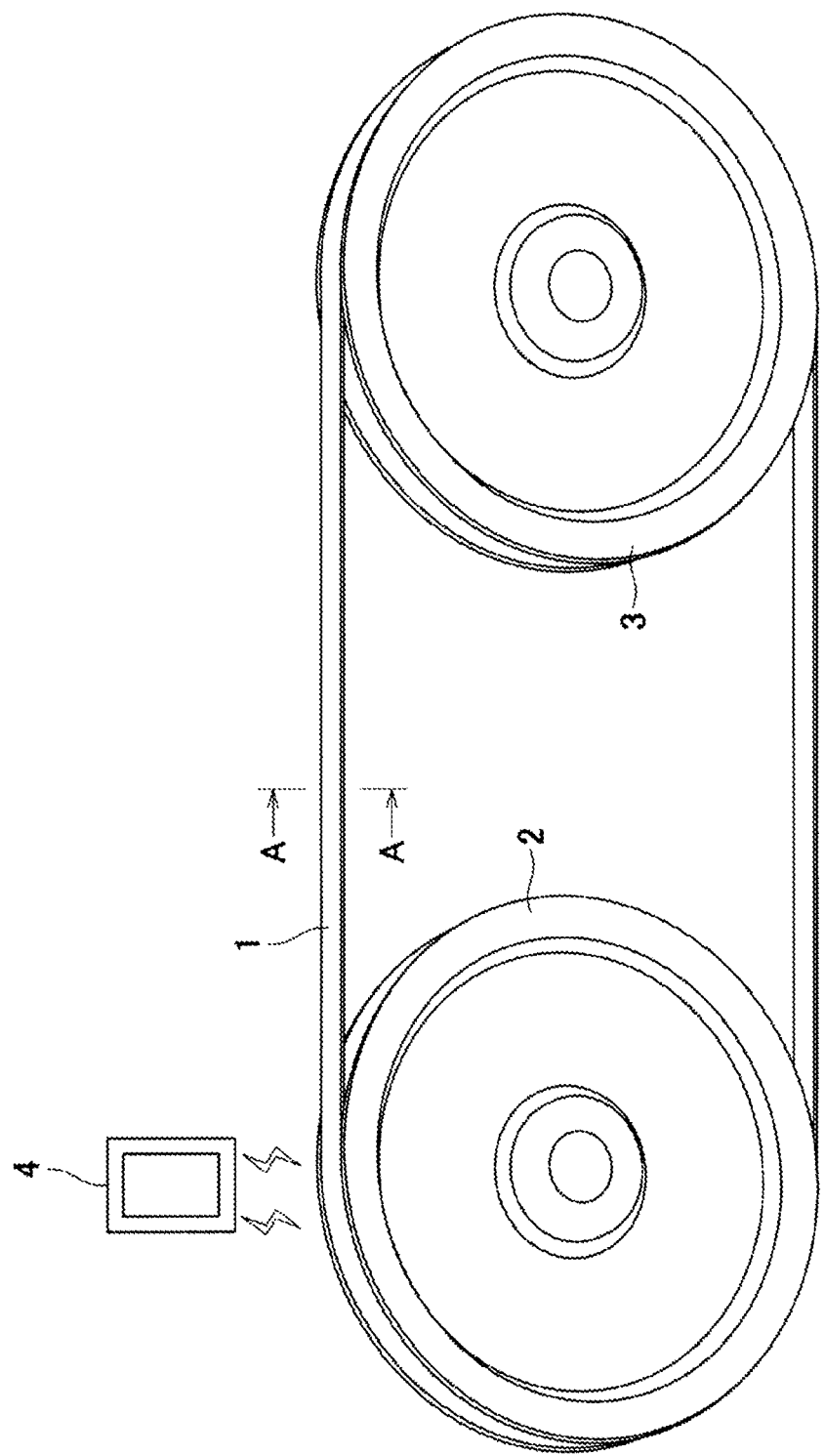

[FIG. 2]
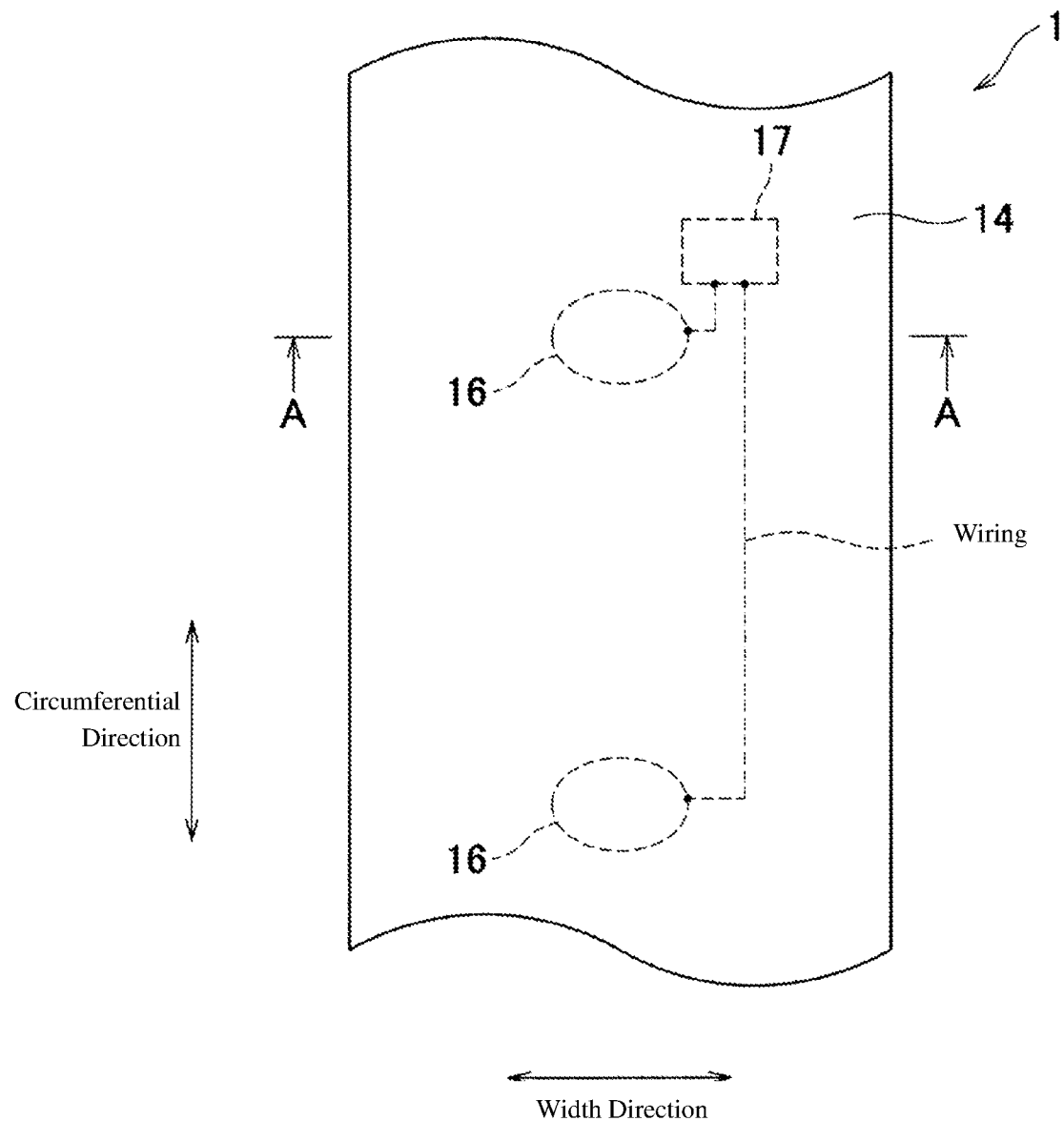

[FIG. 3]
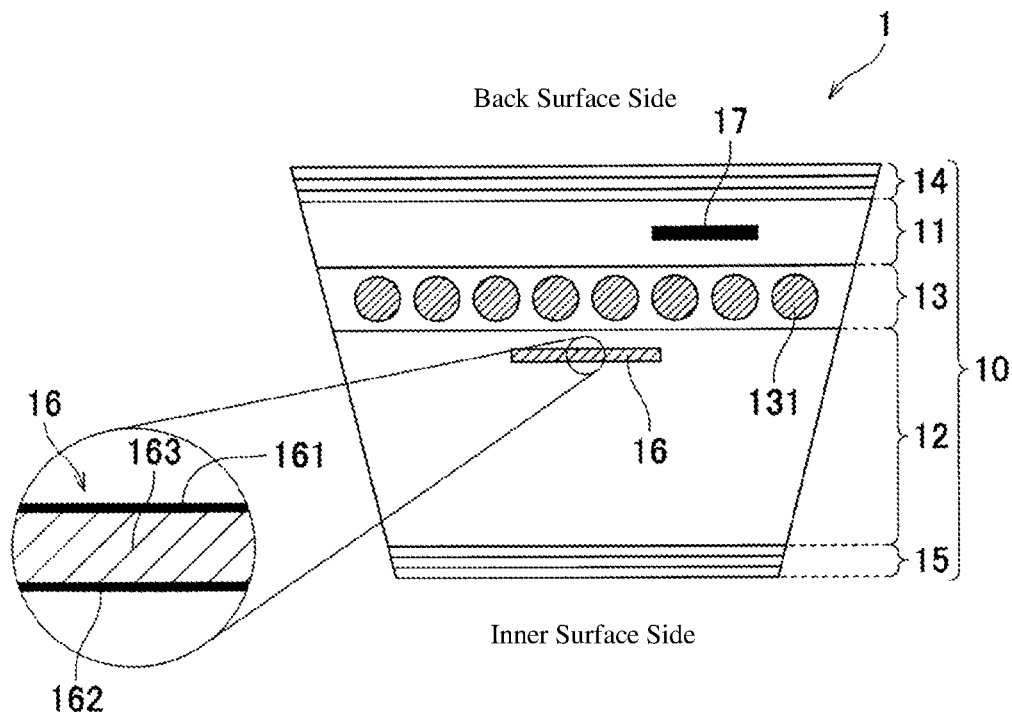
[FIG. 4]
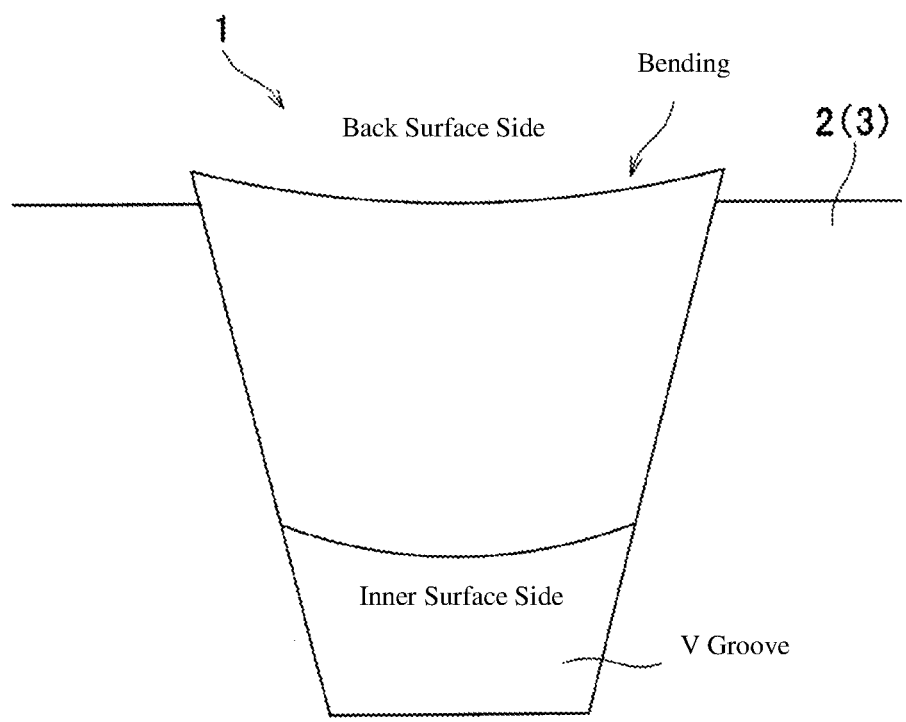

[FIG. 5]
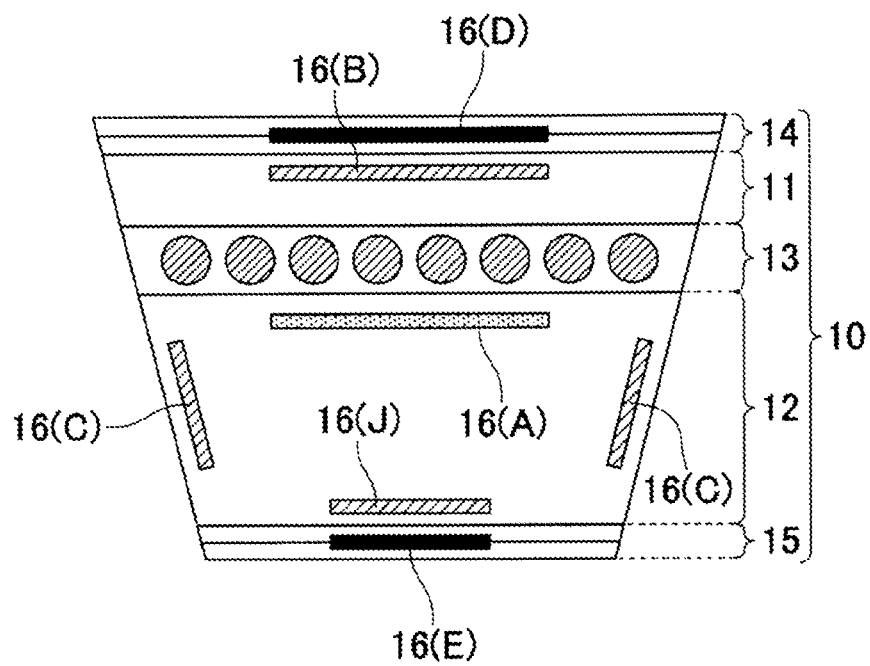
[FIG. 6]
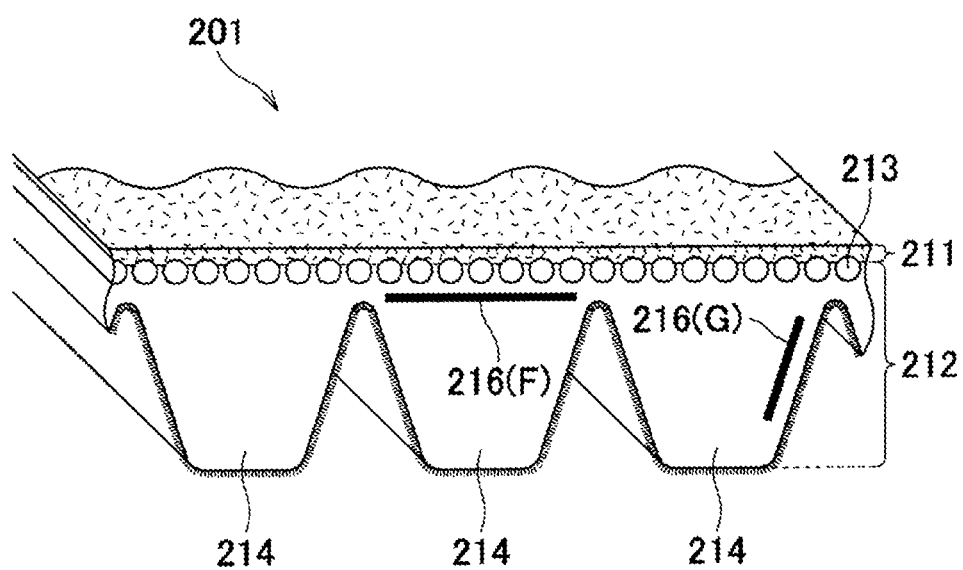

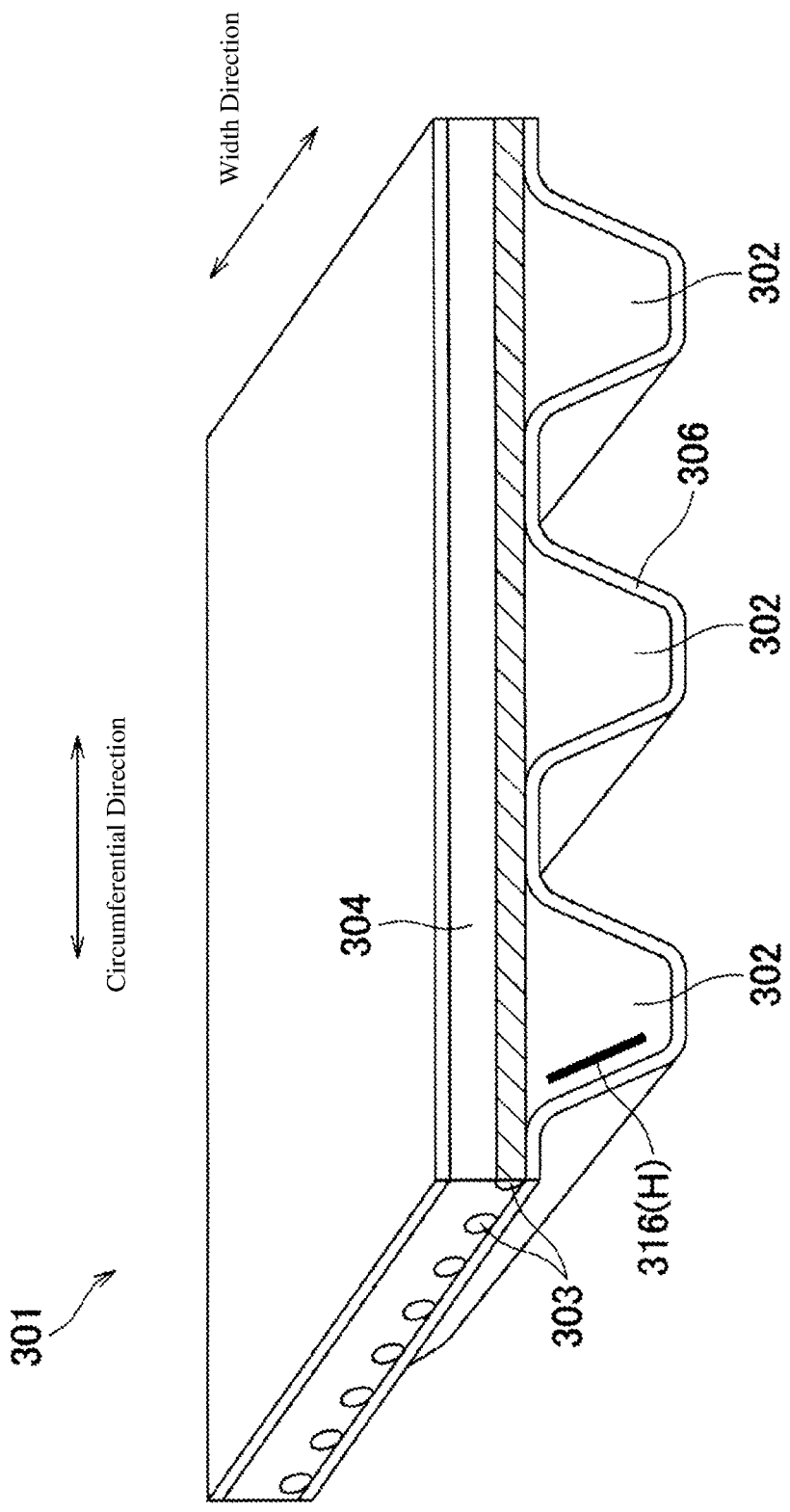
[FIG. 7]

[FIG. 8]
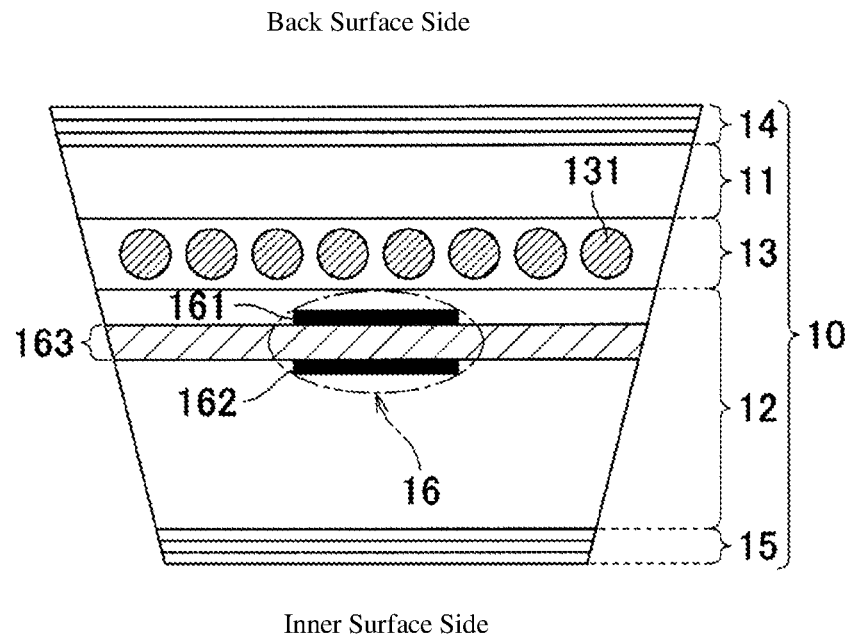
[FIG. 9]
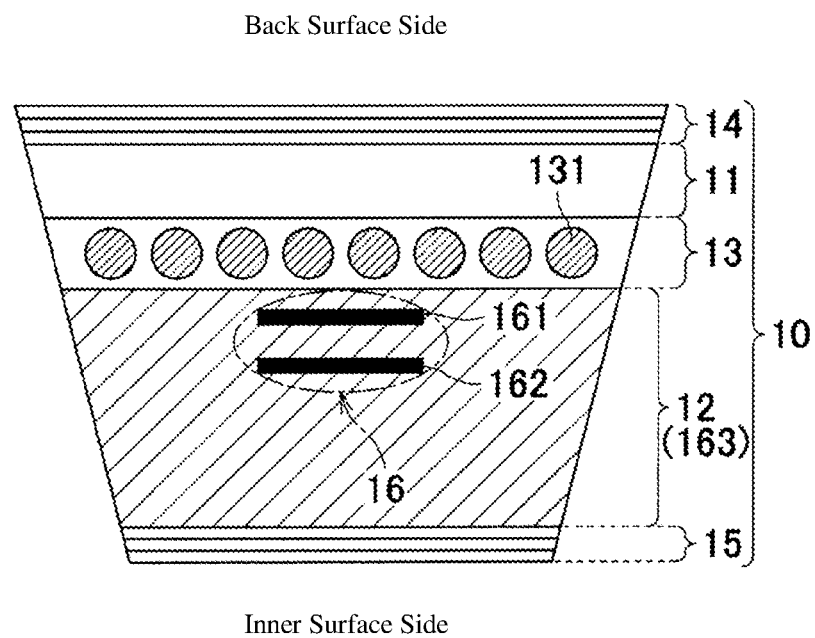

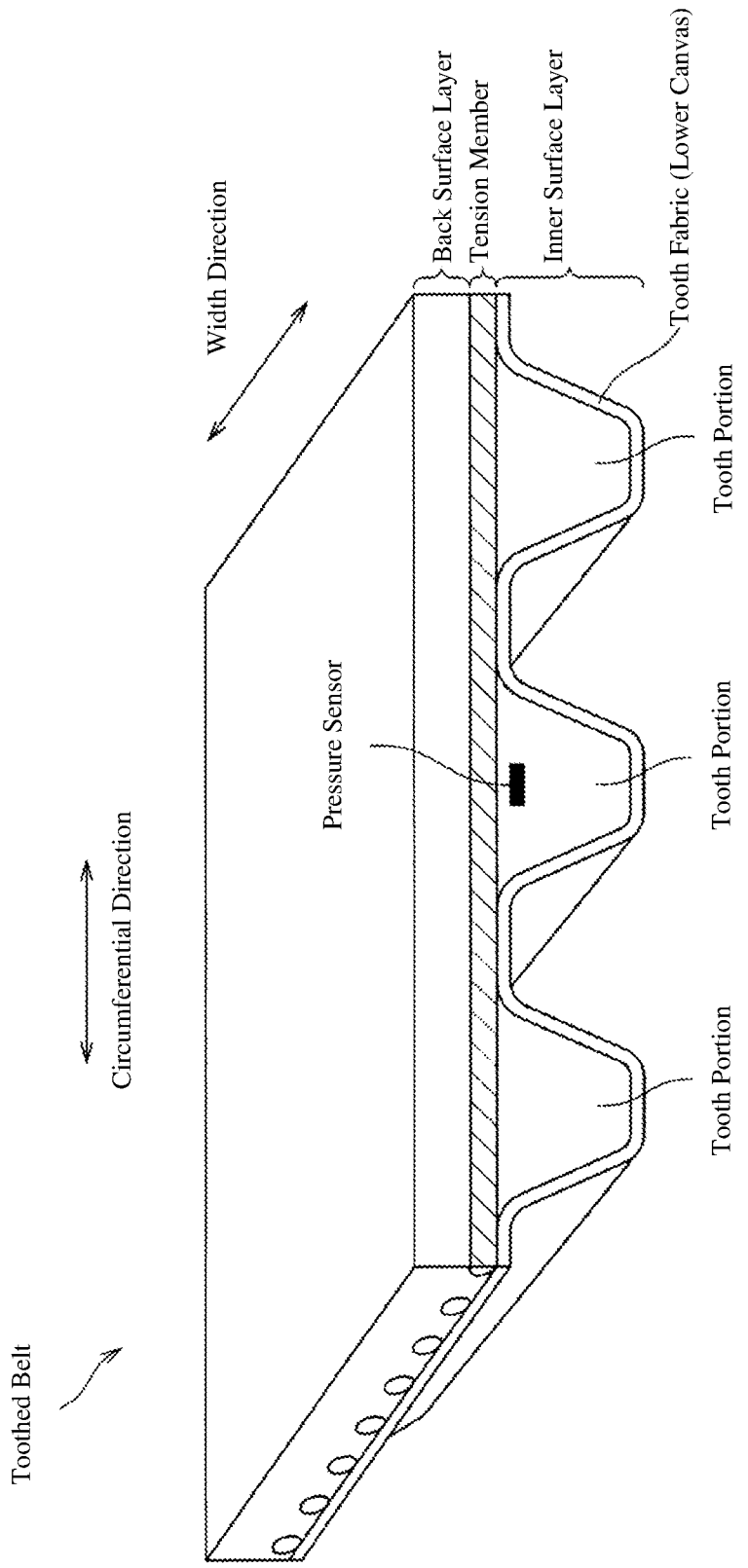
[FIG. 10]

[FIG. 11]
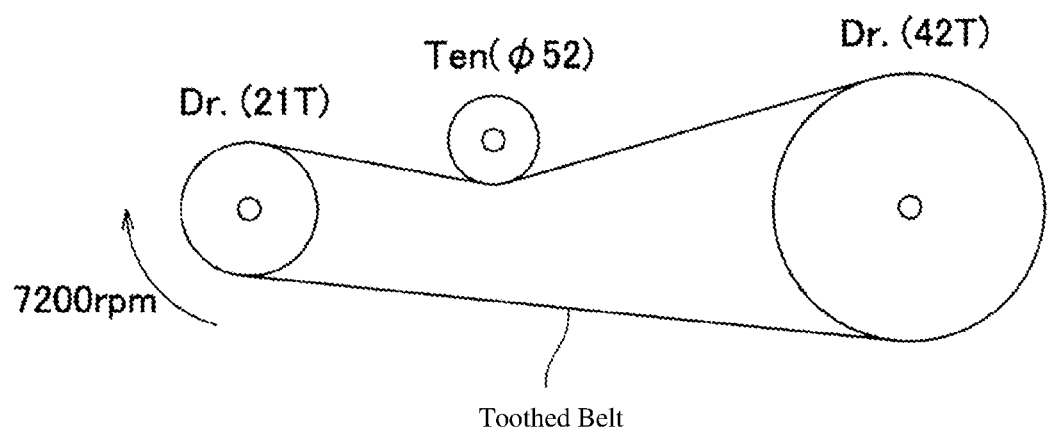

[FIG. 12]
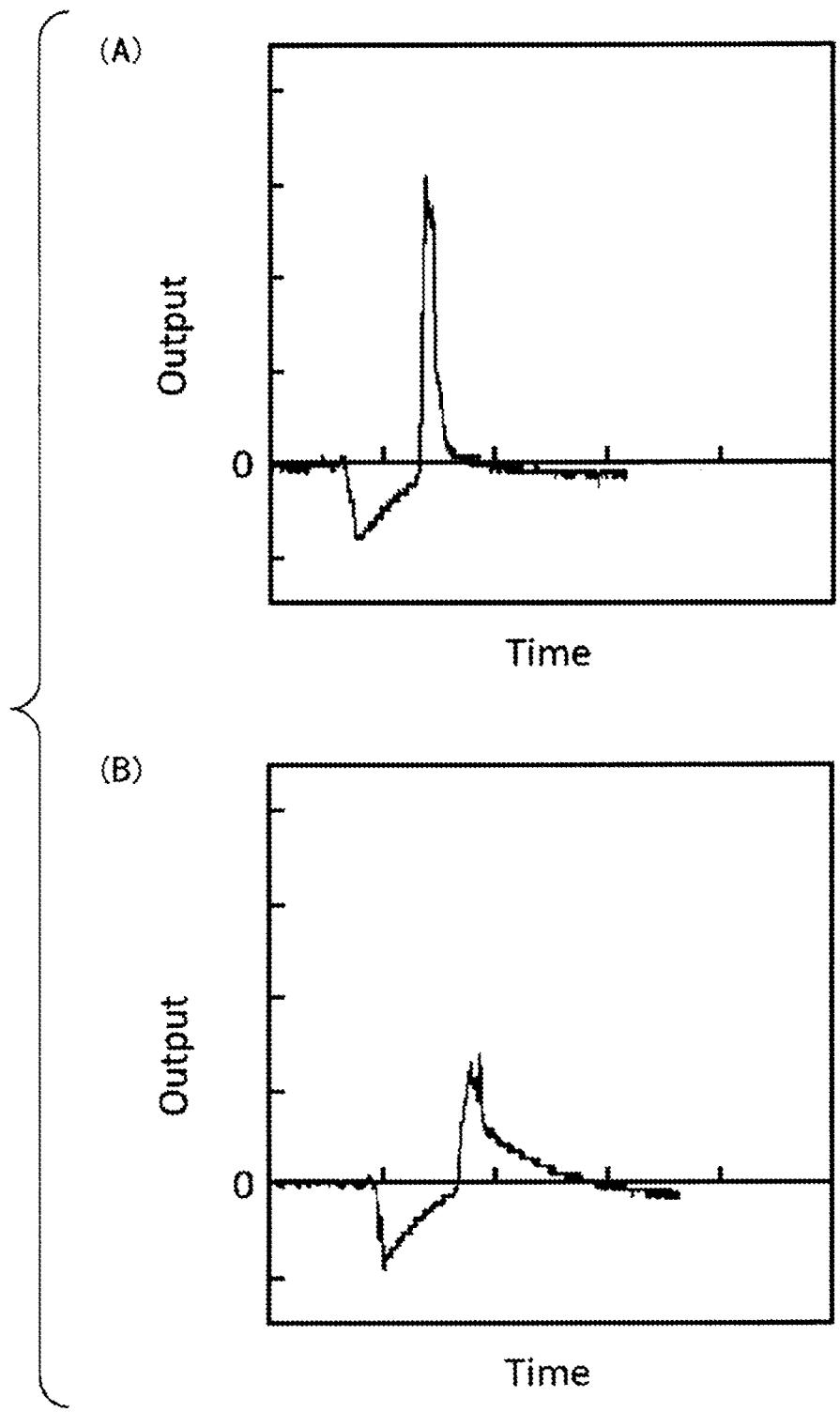

_US 11,614,144 B2_

TRANSMISSION BELT AND SYSTEM FOR OBTAINING TRANSMISSION BELT STATUS INFORMATION

CROSS REFERENCE TO RELATED APPLICATIONS

This is a U.S. National Phase Application under 35 U.S.C. § 371 of International Application No. PCT/JP2018/046847, filed Dec. 19, 2018, which claims priority to Japanese Application Nos. 2017-242968, filed Dec. 19, 2017, 2017-243510, filed Dec. 20, 2017, and 2018-232408, filed Dec. 12, 2018, which was published Under PCT Article 21(2), the entire contents of which are incorporated herein by reference.

TECHNICAL FIELD

The present invention relates to a power transmission belt having a function of detecting a status of the power transmission belt, and a system for acquiring status information of the power transmission belt.

BACKGROUND ART

Power transmission belts have been widely used as power transmission belts for general industry, precision equipment and the like because of their excellent appearance and little likelihood of generating abrasion dusts. Such a power transmission belt is wound around pulleys under a tension, and transmits power between the pulleys when the power transmission belt runs between the pulleys owing to a rotational driving of the pulley.

As described above, when the power transmission belt runs between the pulleys, the power transmission belt continues to receive various external pressure and internal pressure (external force and external force), such as a tension applied to the power transmission belt itself, a received propulsive force generated by the rotation driving of the pulley, and a force that deforms the power transmission belt in a curved shape when running around an outer circumference of the pulleys. If the power transmission belt continues to be used under such external pressure and internal pressure, the power transmission belt needs to be replaced since it is deteriorated due to the influences of the pressure applied to the power transmission belt, a rise in internal temperature caused by the pressures, a frictional heat, or the like.

In this regard, the external pressure and the internal pressure received by the power transmission belt change when there is aging deterioration or damage due to the use of the power transmission belt. For example, due to the deterioration or damage of the power transmission belt, the tension applied to the power transmission belt itself weakens, the received propulsive force generated by the rotation driving of the pulley weakens, or the force applied to the power transmission belt when running around the outer circumference of the pulleys changes. In addition, when the external pressure and the internal pressure received by the power transmission belt change, the internal temperature of the power transmission belt also changes.

Therefore, it is conceivable to employ a mechanism for detecting and observing a status of the power transmission belt, such as a pressure or temperature applied to the power transmission belt, to grasp the status of the power transmission belt and determine a replacement time.

Although it belongs to a technical field different from the present invention, such a mechanism is disclosed in Patent Literature 1 as a configuration for detecting a pressure, temperature and vibration of a tire for a vehicle by disposing a sensor in the tire.

CITATION LIST

Patent Literature

Patent Literature 1: Japanese Patent No. 5632519

SUMMARY OF INVENTION

Technical Problem

However, in the tire described in Patent Literature 1, the sensor may be disposed in a large internal space to be filled with air. In addition, although Patent Literature 1 also discloses an embodiment in which the sensor is embedded in a rubber portion of the tire, for the durability of the sensor, only the pressure received from a thickness direction of the tire needs to be considered, and this property is different from the external pressure and the internal pressure applied to a power transmission belt whose thickness is smaller than that of the tire. Furthermore, there is no mention or suggestion of a structure, disposition place or material with which the sensor can withstand various external pressure and internal pressure.

Therefore, in view of the specialty of the power transmission belt continuously receiving various external pressure and internal pressure, such as a tension applied to the power transmission belt itself, a received propulsive force generated by the rotation driving of a pulley and a force that deforms the power transmission belt in a curved shape when running around an outer circumference of the pulleys, the present invention is to provide a power transmission belt capable of detecting and observing the status of the power transmission belt and a status information acquisition system for power transmission belt.

Solution to Problem

The present invention provides a power transmission belt including a stacked body including a back surface layer disposed on a back surface side, an inner surface layer disposed on an inner surface side, and a tension member layer containing a tension member embedded between the back surface layer and the inner surface layer, in which the power transmission belt includes a sensor configured to detect a status of the power transmission belt, as at least a part of the stacked body.

In the above-described configuration, the sensor configured to detect a status of the power transmission belt is included in the stacked body including the back surface layer, the tension member layer and the inner surface layer, so that the status of the power transmission belt can be detected and observed. Therefore, a replacement time can be determined by accurately grasping the status of the power transmission belt.

In addition, in the present invention, it is preferable that, in the above-described power transmission belt, the sensor is integrated as at least a part of the stacked body.

In the above-described configuration, the sensor is integrated with the power transmission belt, so that strength, elasticity, durability, and the like for ensuring functions as a power transmission belt for transmitting power can be attained without impairing the appearance.

Furthermore, in the present invention, it is preferable that, in the above-described power transmission belt, the sensor is disposed toward a back surface side in the inner surface layer and at a center in a width direction of the power transmission belt.

Since the sensor is disposed at a central portion in a cross section of the power transmission belt, the above-described configuration is suitable for uniformly detecting and observing changes due to, for example, various pressures applied to the entire power transmission belt, such as a pressure applied from the inner surface side of the power transmission belt or a pressure applied from the back surface side. The phrase "disposed toward a back surface side in the inner surface layer" means that in the cross section of the power transmission belt in the width direction, a center of the sensor is situated nearer the back surface side 10% or more of the thickness of the inner surface layer in relation to a center of the inner surface layer. In addition, the phrase "disposed at a center in the width direction" means that in the width direction of the power transmission belt, the center of the sensor is within ±10% from the center of the inner surface layer.

Furthermore, in the present invention, it is preferable that, in the above-described power transmission belt, the sensor is disposed toward a back surface side in the back surface layer and at a center in a width direction of the power transmission belt.

Since the sensor is disposed at a center portion in the width direction on the back surface of the power transmission belt, the above-described configuration is suitable for the case of detecting and observing a change in pressure or the like generated as a bending on the back surface side of the power transmission belt in a state where the power transmission belt is fitted in a groove provided in an outer circumference of a pulley. The phrase "disposed toward a back surface side in the back surface layer" means that in the cross section of the power transmission belt in the width direction, the center of the sensor is situated nearer the back surface side in relation to a center of the back surface layer Furthermore, in the present invention, it is preferable that, in the above-described power transmission belt, the sensor is disposed toward a surface side in the inner surface layer to be in contact with a pulley around which the power transmission belt is wound.

Since the sensor is disposed near a contact portion between the power transmission belt and a pulley, the above-described configuration is suitable for the case of detecting and observing a change in pressure or the like generated when the power transmission belt wound around pulleys is in contact with the pulley. The phrase "disposed toward a surface side in the inner surface layer to be in contact with a pulley around which the power transmission belt is wound" means that in the width direction of the power transmission belt, the center of the sensor is situated nearer the surface side to be in contact with a pulley 10% or more in relation to the center of the inner surface layer.

Furthermore, in the present invention, it is preferable that the power transmission belt includes a plurality of the sensors, and the plurality of the sensors are disposed at predetermined intervals in a circumferential length direction of the power transmission belt.

In a power transmission belt wound between pulleys, at the time when the running power transmission belt is in contact with the pulley, a pressure stronger than a pressure at the time when running between the pulleys is instantaneously applied to the contact portion. When the strong pressure or a change derived therefrom is detected with the sensors disposed at the predetermined intervals, and the predetermined interval (distance) is divided by a time difference (time) detected by the sensors, a running speed of the power transmission belt can be calculated. Furthermore, a slip rate of the power transmission belt can also be calculated from a difference between the calculated running speed of the power transmission belt and a rotation speed of the pulley measured separately.

Furthermore, in the present invention, it is preferable that, in the above-described power transmission belt, the stacked body further includes an outer fabric layer on at least a part of an outer circumference thereof, and the sensor is included in at least a part of the outer fabric layer.

In the above-described configuration, the sensor configured to detect a status of the power transmission belt is included in a part of the outer fabric layer of the stacked body including the back surface layer, the tension member layer, the inner surface layer, and the outer fabric layer, so that the status of the surface of the power transmission belt can be accurately detected and observed.

Furthermore, in the present invention, it is preferable that the above-described power transmission belt further includes a transmission unit configured to transmit status information of the power transmission belt detected by the sensor to an outside, and the transmission unit is embedded in the back surface layer or in the inner surface layer.

In the above-described configuration, the transmission unit is embedded in the back surface layer or in the inner surface layer of the power transmission belt, so that a function of the transmission unit can be performed without deteriorating the appearance. In addition, since the back surface layer or inner surface layer of the power transmission belt is a position where a direct pressure is less likely to be applied compared to the surface, it is possible to avoid that an excessive load is applied to the transmission unit as an electronic device.

Furthermore, in the present invention, it is preferable that, in the above-described power transmission belt, the sensor is a pressure sensor configured to detect a status of a pressure applied to the power transmission belt.

In the above configuration, the pressure applied to the power transmission belt can be detected and observed by the pressure sensor provided in the power transmission belt. Based on a value of the pressure detected and observed, a degree of deterioration or damage of the power transmission belt and an abnormality of the pulley around which the power transmission belt is wound or the like can be grasped.

Furthermore, in the present invention, it is preferable that, in the above-described power transmission belt, the pressure sensor is a film-shaped piezoelectric body containing an organic polymer and having a pair of electrodes formed on both surfaces thereof.

Since the pressure sensor has a film shape, that the above-described configuration can be adopted even in a power transmission belt having a relatively small thickness. In addition, in a manufacturing process, it is only necessary to add a step of layering a film-shaped pressure sensor on the power transmission belt to be configured as a stacked body, which contributes to an efficient manufacturing of the power transmission belt while utilizing an existing manufacturing process. Furthermore, the pressure sensor having a film shape is suitable for the case of detecting a pressure in the thickness direction of the pressure sensor.

Furthermore, in the present invention, it is preferable that, in the above-described power transmission belt, the pressure sensor has a configuration in which a pair of electrodes is disposed on both surfaces of a piezoelectric body containing a rubber composition and a piezoelectric powder dispersed therein.

In the above-described configuration, the piezoelectric powder is dispersed to be incorporated into the rubber composition constituting the stacked body, so that the pressure sensor can be included in the power transmission belt. In addition, in a manufacturing process, it is only necessary to add a step of mixing the piezoelectric powder into the rubber composition constituting the stacked body, which contributes to an efficient manufacturing of the power transmission belt while utilizing an existing manufacturing process. Furthermore, since a function as a piezoelectric body can be provided only by dispersing the piezoelectric powder in the rubber composition mainly constituting the stacked body, a desired portion in the power transmission belt can be functioned as the pressure sensor.

In addition, the present invention provides a status information acquisition system for power transmission belt including:

a power transmission belt including
a stacked body including a back surface layer disposed on a back surface side, an inner surface layer disposed on an inner surface side, and a tension member layer having a tension member embedded between the back surface layer and the inner surface layer,
a sensor provided on at least a part of the stacked body and configured to detect a status of the power transmission belt, and
a transmission unit embedded in the back surface layer or in the inner surface layer and configured to transmit status information of the power transmission belt detected by the sensor to an outside; and
a receiver configured to receive the status information of the power transmission belt transmitted from the transmission unit.

In the above-described configuration, the receiver is disposed or brought close to a place with a certain distance away from the power transmission belt including the transmission unit, so that the status information of the power transmission belt detected by the sensor can be received. Accordingly, the status information of the power transmission belt can be acquired from a place with a certain distance away from the power transmission belt running at a high speed between pulleys.

Advantageous Effects of Invention

In view of the specialty of the power transmission belt continuously receiving various external pressure and internal pressure, such as a tension applied to the power transmission belt itself, a received propulsive force generated by the rotation driving of a pulley, and a force that deforms the power transmission belt in a curved shape when running around an outer circumference of the pulleys, it is possible to provide a power transmission belt capable of detecting and observing a status of the power transmission belt and a status information acquisition system for power transmission belt.

BRIEF DESCRIPTION OF DRAWINGS

FIG. 1 is an explanatory diagram illustrating a V belt and a system for acquiring pressure data of the V belt in the present embodiment.

FIG. 2 is a partially enlarged top view of a V belt.

FIG. 3 is an A-A cross-sectional view of a V belt 1.

FIG. 4 is an explanatory diagram illustrating a state where the V belt 1 is fitted in a V groove provided in a drive pulley 2 and a driven pulley 3.

FIG. 5 is an explanatory diagram illustrating a disposition place of a pressure sensor on a V belt.

FIG. 6 is an explanatory diagram illustrating a V-ribbed belt of another embodiment.

FIG. 7 is an explanatory diagram illustrating a toothed belt of yet another embodiment.

FIG. 8 is a cross-sectional view in a belt width direction of a V belt including a pressure sensor having a piezoelectric layer in which a piezoelectric powder is dispersed in a rubber composition constituting a compression layer, in a part of the compression layer.

FIG. 9 is a cross-sectional view in a belt width direction of a V belt including a pressure sensor having a piezoelectric layer formed of a rubber composition in which a piezoelectric powder is dispersed throughout a compression layer.

FIG. 10 is a cross-sectional view at a center in a belt width direction of a toothed belt of Example.

FIG. 11 is a layout of a running test device used for a running test of the toothed belt of Example.

FIG. 12 shows graphed experimental data representing a change in a signal when the toothed belt of Example passes through the pulley. (A) of FIG. 12 shows a signal when the toothed belt is running with normal tension. (B) of FIG. 12 shows a signal when the toothed belt is running in a state where the tension is lower than that in the case of (A) of FIG. 12.

DESCRIPTION OF EMBODIMENTS

Embodiments

Hereinafter, a power transmission belt and a status information acquisition system for power transmission belt of the present invention will be described with reference to the drawings.

In the power transmission belt of the present embodiment, a V belt 1 including a pressure sensor 16 will be described as an example. The V belt 1 is used, for example, by being wound around a drive pulley 2 and a driven pulley 3 in a power transmission mechanism (system) such as an engine accessory drive system (see FIG. 1).

(Configuration of V Belt 1)

As illustrated in FIG. 2 and FIG. 3, the V belt 1 includes a tension layer 11 (corresponding to a back surface layer) disposed on a back surface side of the V belt 1, a compression layer 12 (corresponding to an inner surface layer) disposed on an inner surface side of the V belt 1, a tension member layer 13 provided between the tension layer 11 and the compression layer 12 and including a tension member 131 spirally embedded along a circumferential length direction of the V belt 1, an upper canvas 14 (corresponding to an outer fabric layer) disposed on a back surface of the V belt 1, a lower canvas 15 (corresponding to the outer fabric layer) disposed on an inner surface of the V belt 1, two pressure sensors 16 disposed at a predetermined interval in the circumferential length direction at a center in a width direction of the V belt 1 toward the back surface side in the compression layer 12, and a transmitter 17 (corresponding to a transmission unit) disposed on one end side of the tension layer 11 in the width direction of the V belt 1. In the V belt 1 of the present embodiment, the upper canvas 14, the tension layer 11, the tension member layer 13, the compression layer 12, and the lower canvas 15 constitute a stacked body 10.

In addition, as illustrated in FIG. 3, the cross section of the V belt 1 in the width direction of the V belt 1 is a V-shaped cross section, and left and right side surfaces of the V-shaped cross section serve as frictional power transmission surfaces that come into contact with inner wall surfaces of V grooves provided in the drive pulley 2 and the driven pulley 3 (see FIG. 4).

(Tension Layer 11)

Examples of a rubber component of the rubber composition forming the tension layer 11 include vulcanizable or crosslinkable rubbers, such as diene rubbers (a natural rubber, an isoprene rubber, a butadiene rubber, a chloroprene rubber, a styrene-butadiene rubber (SBR), an acrylonitrile butadiene rubber (nitrile rubber), a hydrogenated nitrile rubber, etc.), an ethylene-α-olefin elastomer, a chlorosulfonated polyethylene rubber, an alkylated chlorosulfonated polyethylene rubber, epichlorohydrin rubber, an acrylic rubber, a silicone rubber, a urethane rubber, a fluorine rubber, and the like. These rubber components can be used alone or in combination of two or more thereof. Preferred rubber components are ethylene-α-olefin elastomers (ethylene-α-olefin rubbers such as an ethylene-propylene copolymer (EPM) and an ethylene-propylene-diene terpolymer (EPDM)), and a chloroprene rubber. Particularly preferred rubber components are ethylene-α-olefin elastomers which contain no halogen and are excellent in durability as compared to the chloroprene rubber. Examples of a diene monomer in EPDM include dicyclopentadiene, methylene norbornene, ethylidene norbornene, 1,4-hexadiene, cyclooctadiene, or the like.

In addition, if necessary, the rubber composition forming the tension layer 11 may be blended with those generally to be blended with the rubber, for example, reinforcing materials such as carbon black, silica and short fibers, fillers such as calcium carbonate and talc, crosslinking agents such as sulfur and organic peroxides, co-crosslinking agents such as N,N'-m-phenylenedimaleimide and quinone dioximes, vulcanization accelerators, plasticizers, stabilizers, processing aids, colorants, and the like. As the short fiber, use can be made of cotton, polyesters (PET, PEN, etc.), nylon (6 nylon, 66 nylon, 46 nylon, etc.), aramids (p-aramid and m-aramid), vinylon, polyparaphenylene benzobisoxazole (PBO) fibers, and the like. These short fibers can be used alone or in combination of two or more thereof.

(Compression Layer 12)

The compression layer 12 may be formed of the same rubber composition forming the tension layer 11.

(Tension Member Layer 13)

In the tension member layer 13, the tension member 131 is spirally embedded in the rubber composition along the circumferential length direction of the V belt 1. The rubber composition constituting the tension member layer 13 is preferably a blending composition that emphasizes adhesion and stress resistance more than the rubber compositions of the tension layer 11 and the compression layer 12, from the viewpoints of the adhesion to the tension member 131 and relaxation of stress applied to the tension member 131. Accordingly, the spirally embedded tension member 131 is arranged in a state at a predetermined interval in the width direction in a cross-sectional view in the width direction of the V belt 1.

In terms of high modulus, as the fiber constituting the tension member 131, use can be made of synthetic fibers such as polyester fibers having C2-4 alkylene arylate such as ethylene terephthalate and ethylene-2,6-naphthalate as a main constituent unit (a polyalkylene arylate fiber, a polyethylene terephthalate fiber, a polyethylene naphthalate fiber, etc.) and aramid fibers, and inorganic fibers such as carbon fibers. Polyester fibers and aramid fibers are preferred. These fibers may be multifilament yarns. The fineness of the multifilament yarn may be 2,000 to 10,000 deniers, and preferably 4,000 to 8,000 deniers.

As the tension member 131, a twisted cord (multi-twist, single-twist, Lang-twist, etc.) using a multifilament yarn is often used. The average wire diameter (cord diameter of the twisted cord) of the tension member 131 may be 0.5 to 3 mm, preferably 0.6 to 2 mm, and more preferably 0.7 to 1.5 mm.

In the present embodiment, one continuous tension member 131 is spirally wound in the circumferential length direction of the V belt 1 and embedded. However, a plurality of bundled tension members 131 may be spirally wound in the circumferential length direction of the V belt 1 and embedded.

(Upper Canvas 14 and Lower Canvas 15)

The upper canvas 14 and the lower canvas 15 are, for example, made of cotton, polyester fiber, nylon, or the like, and are fabrics woven in plain weave, twill weave, satin weave, or the like, and woven fabrics in which a crossing angle between a warp yarn and a weft yarn is widened to about 90° to 120°.

(Pressure Sensor 16)

The pressure sensor 16 utilizes, for example, a piezoelectric element that generates an electric charge when receiving a pressure. Therefore, as illustrated in FIG. 3, electrode layers 161 and 162 are provided on both surfaces of a film-shaped piezoelectric layer 163 containing an organic polymer. In the present embodiment, the thickness of the piezoelectric layer 163 is about 1 to 10 μm, and the thickness of the electrode layers 161 and 162 is also about 0.1 to 0.3 μm, so that the pressure sensor 16 has a thin configuration. The pressure sensor 16 is electrically connected to the transmitter 17 from the electrode layers 161 and 162. In the present embodiment, as illustrated in FIG. 2, two pressure sensors 16 are disposed at a predetermined interval in the circumferential length direction.

Examples of a material of the piezoelectric layer 163 include polyvinylidene fluoride, a copolymer of vinylidene fluoride and trifluoride ethylene, polylactic acid, a vinylidene cyanide polymer, odd nylon such as nylon 9 and nylon 11, aramid, polyurea, and the like.

Examples of the electrode layers 161 and 162 include a deposited film, a metal net or wire, and a conductive rubber. Examples of the deposited film include, in addition to a Ni—Al alloy, aluminum (Al), iron (Fe), copper (Cu), gold (Au), silver (Ag), and an alloy thereof. Examples of the metal net or wire include iron (Fe), copper (Cu), a copper alloy, and an aluminum alloy. Examples of the conductive rubber include those obtained by forming a rubber composition used for the compression layer or the tension layer into a sheet having a thickness of 10 μm to 5 mm.

In addition, the electrode layers 161 and 162 are preferably subjected to a surface treatment for bonding (integrating) with a surrounding rubber layer (a portion including a rubber composition in the stacked body 10) through chemical or physical bonding. Examples of the surface treatment include coating (stacking) of a resin film, a silane coupling treatment, and the like.

As described above, since the pressure sensor 16 has a film shape, the pressure sensor 16 can be integrated with the stacked body 10 even in the V belt 1 having a relatively small thickness. In addition, in a manufacturing process, it is only necessary to add a step of layering a film-shaped pressure sensor 16 on the V belt 1 to be configured as the stacked body 10, which contributes to an efficient manufacturing of the V belt 1 while utilizing an existing manufacturing process. Furthermore, the pressure sensor 16 having a film shape is suitable for the case of detecting a pressure in the thickness direction of the pressure sensor 16.

The pressure sensor 16 has a small thickness as described above, is stacked at a center in the width direction on the back surface side in the compression layer 12, and is integrated as a part of the V belt 1.

Here, the phrase "the sensor is integrated with the belt" means that, in a broad sense, (A) the sensor is integrated with the belt in appearance, and (B) a belt including a sensor has strength, elasticity, durability, and the like for ensuring functions as a power transmission belt, in order to be distinguished from a method of externally attaching a commercially available sensor to the belt or simply embedding the sensor in the belt. Furthermore, in a narrow sense, the phrase means that, in addition to the above-described (A) and (B), (C) from the viewpoint of a bonding state at an interface (boundary) between a sensor component (e.g., piezoelectric layer+electrode (both sides)) and the stacked body (e.g., a portion of the stacked body, containing a rubber composition), the interface is bonded through a chemical bonding or a physical bonding. For example, in the case where the sensor is a pressure sensor and the electrode layer is made of a metal, they cannot be bonded with the surrounding rubber layer (a portion of the stacked body, containing a rubber composition) as they are, so that the surface treatment described above is preferably performed (preferably, the condition (C) is satisfied).

Therefore, as illustrated in FIG. 5, the pressure sensor 16 may be disposed at the center in the width direction toward the back surface side in the compression layer 12 (position A), and the pressure sensor 16 may also be disposed at a center in the width direction toward the back surface side in the tension layer 11 (position B). In addition, the pressure sensor 16 may be disposed toward both side surface sides of the compression layer 12, that is, toward frictional power transmission surface sides (positions C) where the V belt 1 comes into contact with inner wall surfaces of V grooves provided in the drive pulley 2 and the driven pulley 3. In the case where the pressure sensor 16 is disposed toward the side surface side of the compression layer 12 (position C), the pressure sensor 16 may be disposed only toward one side surface side. Furthermore, the pressure sensor 16 may be disposed in a state interknitted in the upper canvas 14 (position D) or may be disposed in a state interknitted in the lower canvas 15 (position E). Furthermore, the pressure sensor 16 may be disposed at a center in the width direction toward an inner surface side in the compression layer 12 (position J).

As described above, in the case of being disposed at the position A, the pressure sensor 16 is suitable for uniformly detecting and observing various pressures applied to the entire V belt 1, such as a pressure applied from the inner surface side of the V belt 1 and a pressure applied from the back surface side. In addition, in the case of being disposed at the position B, the pressure sensor 16 is suitable for detecting and observing a pressure generated as a bending on the back surface side of the V belt 1 in a state where the V belt 1 is fitted into the V grooves provided in the drive pulley 2 and the driven pulley 3, as illustrated in FIG. 4. Furthermore, in the case of being disposed at the position J, the pressure sensor 16 is suitable for detecting and observing a pressure generated as a bending on the inner surface side of the V belt 1 in a state where the V belt 1 is fitted into the V grooves provided in the drive pulley 2 and the driven pulley 3, as illustrated in FIG. 4. Furthermore, in the case of being disposed at the position C, the pressure sensor 16 is suitable for detecting and observing a pressure at the time when the running V belt 1 is in contact with the drive pulley 2 and the driven pulley 3. In the case of being disposed toward both side surface sides of the compression layer 12, the pressure sensor 16 contributes to a straight running of the V belt 1. Furthermore, in the case of being disposed at the position D, similar to the case of the position B, the pressure sensor 16 is suitable for detecting and observing a pressure generated as a bending on the back surface side of the V belt 1. Furthermore, in the case of being disposed at the position E, as illustrated in FIG. 4, the pressure sensor 16 is suitable for detecting and observing a pressure generated as a bending on the inner surface side of the V belt 1.

In the present embodiment, a film-shaped piezoelectric layer 163 containing an organic polymer is used as the pressure sensor 16. However, the pressure sensor 16 may have a configuration in which the piezoelectric layer 163 is formed by dispersing a piezoelectric powder in the rubber composition constituting the tension layer 11 or the compression layer 12, and the electrode layers 161 and 162 are disposed toward both surfaces thereof, respectively.

For example, as illustrated in FIG. 8, the pressure sensor 16 may be configured by disposing, in a partial layer in the compression layer 12, the piezoelectric layer 163 in which a piezoelectric powder is dispersed in the rubber composition constituting the compression layer 12, and inserting the electrode layers 161 and 162 into upper and lower surfaces of a part of the piezoelectric layer 163.

In addition, as illustrated in FIG. 9, the entire compression layer 12 is produced as the piezoelectric layer 163 formed of a rubber composition in which the piezoelectric powder is dispersed, and two electrode layers 161 and 162 serving as upper and lower electrodes are embedded at desired positions in the piezoelectric layer 163. In this case, the two electrode layers 161 and 162 and a part of the piezoelectric layer 163 sandwiched between the two electrode layers 161 and 162 constitute the pressure sensor 16 and perform the function of the pressure sensor.

In the case of the above-described embodiment, the pressure sensor 16 can be integrated with the V belt 1 by dispersing and incorporating the piezoelectric powder in the rubber composition constituting the compression layer 12 at the manufacturing stage. In addition, in the manufacturing process, it is only necessary to add a step of mixing the piezoelectric powder into the rubber composition constituting the stacked body 10, which also contributes to an efficient manufacturing of the V belt 1 while utilizing an existing manufacturing process. Furthermore, since a function as a piezoelectric body can be provided only by dispersing the piezoelectric powder in the rubber composition constituting the stacked body 10, in the V belt 1, a desired portion can be functioned as the pressure sensor 16.

In the above-described embodiment, in the case where a metal net is used as the electrode layers 161 and 162, in a vulcanization step, a cross-linking reaction (chemical bonding) occurs between the pressure sensor 16 and the surrounding rubber, and at the same time, the metal net and the rubber layer are bonded through an anchor effect (physical bonding), and thus the entire compression layer 12 is integrated. Therefore, integration of the pressure sensor 16 and the V belt 1 can be easily achieved.

In addition, it may have a configuration in which the piezoelectric layer 163 is formed by providing the piezoelectric powder on the upper canvas 14 or the lower canvas 15, and the electrode layers 161 and 162 are disposed on both surfaces thereof. In this case, use can be made of a method of embedding the piezoelectric powder in warp yarns or weft yarns constituting the upper canvas 14 or the lower canvas 15 in advance, and a method of embedding the piezoelectric powder in a bonding treatment.

Examples of the piezoelectric powder include barium titanate, quartz, lead zirconate titanate, lithium niobate, lithium tantalate, potassium sodium tartrate, zinc oxide, and the like. The shape of the piezoelectric powder may be a flake shape or a needle shape.

(Transmitter 17)

In the present embodiment, as illustrated in FIG. 2 and FIG. 3, the transmitter 17 is a thin circuit electrically connected to the pressure sensor 16, and is disposed on one end side in the tension layer 11 in the width direction of the V belt 1. The transmitter 17 spontaneously transmits pressure data (corresponding to status information of the V belt 1) detected and observed by the pressure sensor 16 at a predetermined cycle to an external receiver 4 (described later) by a battery (not illustrated).

The transmitter 17 is preferably disposed at the center in the tension layer 11 in the width direction of the V belt 1. In this case, a straight running of the V belt 1 is facilitated. In addition, the transmitter 17 may be disposed at the center in the compression layer 12 in the width direction of the V belt 1. Furthermore, the transmitter 17 may be disposed on the upper canvas 14 (the back surface of the V belt 1). In this case, it is desirable to cover the transmitter 17 with a protective canvas such that the appearance is not impaired.

In addition, in the present embodiment, as a drive power source for the pressure sensor 16 and the transmitter 17, a battery is described as an example. However, a wireless power supply system in which the power is transmitted from the outside wirelessly or an environmental power generation (a kinetic type in which the power is generated by running the V belt 1, etc.) may be adopted.

As described above, since the transmitter 17 is also integrated with the V belt 1 by embedding the transmitter 17 in the tension layer 11 of the V belt 1, the function thereof can be performed without impairing the appearance. In addition, since the tension layer 11 of the V belt 1 is a place where a direct pressure is less likely to be applied as compared to the compression layer 12, it is possible to avoid that an excessive load is applied to the transmitter 17 as an electronic device.

In the above-described V belt 1, the pressure sensor 16 configured to detect a pressure applied to the V belt 1 is integrated as a part of the stacked body 10, so that the pressure applied to the V belt 1 can be detected and observed. Based on a value of the pressure detected and observed, a degree of deterioration or damage of the V belt 1 and an abnormality of the drive pulley 2 or the driven pulley 3 around which the V belt 1 is wound can be grasped. Accordingly, a replacement time can be determined by accurately grasping the status of the V belt 1. In addition, the pressure sensor 16 is integrated with the V belt 1, so that strength, elasticity, durability, and the like for ensuring functions as a power transmission belt for transmitting power are attained without impairing the appearance.

(System for Acquiring Pressure Data of V Belt 1)

In the present embodiment, as illustrated in FIG. 1, a system 100 (corresponding to a status information acquisition system for power transmission belt) for acquiring pressure data (status information) of the V belt 1, which can detect and observe a pressure applied to the V belt 1 by using the V belt 1 wound around the drive pulley 2 and the driven pulley 3 and the receiver 4, can be implemented.

Examples of the receiver 4 include a mobile tablet or the like. The receiver 4 has a configuration which can store, analyze and display the analysis result under program control, after receiving the pressure data transmitted from the transmitter 17 included in the V belt 1.

The receiver 4 may be configured to include only a reception function unit and to be installed on the drive pulley 2, the driven pulley 3, or an object (a peripheral device, a cover, etc.) disposed around the V belt 1. In this case, a personal computer or the like is connected to the receiver 4 and receives the pressure data transmitted from the transmitter 17, then stores, analyzes, and displays the analysis result under program control of the personal computer.

For example, in the analysis under program control, not only the pressure value of the V belt 1 is output, but also the pressure data (value) detected and observed by the pressure sensor 16 and transmitted from the transmitter 17 is compared with standard pressure data (value) obtained in advance by analyzing actual measurement data to analyze a degree of deterioration of the V belt 1, and the presence or absence of replacement and the replacement time of the V belt 1 and other abnormalities can be displayed on a display screen of the receiver 4 or the personal computer.

In addition, in the analysis under program control, the pressure applied to the V belt 1 wound around the drive pulley 2 and the driven pulley 3 at the time when the running V belt 1 comes into contact with the drive pulley 2 is detected by two pressure sensors 16 disposed at a predetermined interval, and the predetermined interval (distance) is divided by the time difference (time) detected by the two pressure sensors 16, so that the running speed of the V belt 1 can be calculated. Furthermore, a slip rate of the V belt 1 can also be calculated from a difference between the calculated running speed of the V belt 1 and a rotation speed of the drive pulley 2 measured separately.

Furthermore, in the analysis under program control, the current internal temperature of the V belt 1 can be estimated based on the pressure data (value) detected and observed by the pressure sensor 16 by referring to standard data of an internal temperature of the V belt 1 corresponding to the pressure data (value), obtained in advance by analyzing actual measured data.

In the case where the system 100 for acquiring the pressure data of the V belt 1 is used, when the receiver 4 is disposed or brought close to a place with a certain distance away from the V belt 1 including the transmitter 17, the pressure data of the V belt 1 detected by the pressure sensor 16 can be received. Accordingly, the pressure data of the V belt 1 can be acquired at a place with a certain distance away from the V belt 1 running at a high speed between the drive pulley 2 and the driven pulley 3.

Other Embodiments

Although the V belt 1 has been described in the above-described embodiment, a sensor 216 may be adopted in a V-ribbed belt 201 illustrated in FIG. 6. The V-ribbed belt 201 is formed of a rubber composition, and includes a tension layer 211 (back surface layer), a compression layer 212 (inner surface layer) having three ribs 214 extending parallel to each other along the circumferential length direction of V-ribbed belt 201, and a tension member 213 (tension member layer) embedded between the tension layer 211 and the compression layer 212 along the circumferential length direction of the V-ribbed belt 201. The sensor 216 is disposed, for example, at the center in the width direction toward the back surface side in the compression layer 212 (position F), as illustrated in FIG. 6. In addition, the sensor 216 may be disposed toward one side surface side of the rib 214, that is, toward frictional power transmission surface sides (positions G) where the V-ribbed belt 201 comes into contact with the inner wall surfaces of the V-grooves provided in the drive pulley 2 and the driven pulley 3.

A sensor 316 may be adopted to a toothed belt 301 illustrated in FIG. 7. The toothed belt 301 includes a plurality of tooth portions 302 (inner surface layer) provided at predetermined intervals in a circumferential direction of the toothed belt 301, a back portion 304 (back surface layer) in which a tension member 303 (tension member layer) is embedded, and a tooth fabric 306 covering the surface of the plurality of tooth portions 302. The sensor 316 is disposed, for example, toward a front portion of the tooth portion 302 (position H), as illustrated in FIG. 7, that is, on a surface side where the toothed belt 301 comes into contact with the tooth portion provided on the drive pulley 2 and the driven pulley 3.

In the above-described embodiment, the pressure sensor 16 is disposed in the tension layer 11 or the compression layer 12. However, the pressure sensor 16 may be disposed between the upper canvas 14 and the tension layer 11, or the pressure sensor 16 may be disposed between the tension layer 11 and the tension member layer 13, or the pressure sensor 16 may be disposed between the tension member layer 13 and the compression layer 12, or the pressure sensor 16 may be disposed between the compression layer 12 and the lower canvas 15.

In the case of the V belt 1 having a thin (9 mm) thickness (including power transmission belts such as the V-ribbed belt 201 and the toothed belt 301), the entire V belt 1 may be functioned as a pressure sensor by disposing the electrode layer 161 on the back surface side of the tension layer 11, disposing the electrode layer 162 on the inner surface side of the compression layer 12, and dispersing the piezoelectric powder in the rubber composition constituting the tension layer 11, the tension member layer 13 and the compression layer 12 stacked between the electrode layer 161 and the electrode layer 162 to form the piezoelectric layer 163.

Furthermore, although the sensor described in the above-described embodiment is a pressure sensor, a sensor integrated with the V belt 1 may be a temperature sensor. When the V belt 1 continues to be used under various external pressure and internal pressure applied to the V belt 1, the internal temperature of the V belt 1 rises due to the influences of a rise in internal temperature caused by the pressures, a frictional heat, or the like. Therefore, in the case where a temperature sensor is integrated with the V belt 1 to detect and observe the internal temperature of the V belt 1 (status of the V belt 1), deterioration or damage of the V belt 1 can be grasped.

EXAMPLES

Next, a toothed belt (power transmission belt) of Example, including a pressure sensor was prepared, and a running test and a sensing test were performed.

The configuration, material and the like of the toothed belt of Example will be described below. FIG. 10 is a cross-sectional view at a center in a belt width direction of the toothed belt of Example.

(Configuration of Toothed Belt)
Toothed belt: 124 teeth, tooth mold of MY, tooth pitch of 8 mm
Belt width: 19 mm
Belt circumferential length: 992 mm
The pressure sensor was installed at the center in the belt width direction, 1 mm toward the tooth side (inner circumferential side) in relation to the tension member (see FIG. 10).
Pressure sensor size: 1 mm (length in belt width direction)×1 mm (length in belt circumferential direction)×0.05 mm (thickness)
(Configuration of Pressure Sensor)
Base material: PET film with plasma treated surface
Piezoelectric layer: "copolymer of vinylidene fluoride and ethylene trifluoride" thin film (thickness: 1 µm)
Electrode layer: aluminum deposited film (thickness: 0.1 µm)
(Method of Manufacturing Pressure Sensor)
An aluminum film serving as an electrode layer was formed by vapor deposition on a surface of the base material (PET film with plasma treated surface) that had not been subjected to plasma treatment, and the "copolymer of vinylidene fluoride and ethylene trifluoride" thin film serving as a piezoelectric layer was stacked by spin coating. Then, an aluminum film serving as an electrode layer was stacked by vapor deposition and a PET film identical to the base material was sequentially stacked. The obtained stacked body was used as a pressure sensor.
(Constituent Material of Toothed Belt)
Table 1 shows the configuration of the rubber composition used for the back surface layer (back portion) and the inner surface layer (tooth portion) of the toothed belt.
[Rubber composition constituting back surface layer (back portion) and inner surface layer (tooth portion)]

TABLE 1

| Rubber composition | (part by mass) |
|---|---|
| H-NBR | 100 |
| Zinc oxide | 5 |
| Stearic acid | 1 |
| Carbon black | 50 |
| Sulfur | 1.5 |
| Vulcanization accelerator | 0.5 |

H-NBR: "Zetpole · 2021", manufactured by ZEON CORPORATION
Zinc oxide: "Zinc oxide III", manufactured by SEIDO CHEMICAL INDUSTRY CO., LTD.
Carbon black: "SEAST V", having an average particle diameter of 55 nm and manufactured by Tokai Carbon Co., Ltd.
Vulcanization accelerator: "N-cyclohexyl-2-benzothiazol-sulfenamide", manufactured by OUCHI SHINKO CHEMICAL INDUSTRIAL CO., LTD.

[Tooth Fabric]
As the tooth fabric (corresponding to the lower canvas), a canvas having the following configuration (manufactured by Asahi Kasei Corporation) was used.
 Composition: weft yarn: 66 nylon+urethane yarn, warp yarn: 66 nylon
 Yarn composition: weft yarn: 465 dtex, warp yarn: 155 dtex
 Density: weft yarn: 80 yarns/3 cm, warp yarn: 150 yarns/3 cm
 Woven composition: twill weave
 Thickness: 0.85 mm
A rubber composition having the formulation shown in Table 1 was dissolved in methyl ethyl ketone to prepare a rubber paste, and the canvas was impregnated with this rubber paste. Then, a stacked body (canvas with rubber) obtained by stacking the canvas impregnated with the rubber paste and a rubber sheet (sheet thickness: 2.0 mm) of a rubber composition having the formulation shown in Table 1 was used as the tooth fabric.

[Tension Member]

A twisted cord (raw yarn: ECG150, strand configuration: 3/11, tension member diameter: 1.20 mm) made of glass fiber was subjected to adhesion treatments by an RFL liquid and the above-described rubber paste in this order, and the obtained cord was used as the tension member.

(Method for Manufacturing Toothed Belt)

On a mold engraved with a tooth shape, the canvas with rubber to be the tooth fabric and an unvulcanized rubber sheet (a 2.35 mm thick sheet obtained by kneading and rolling the rubber composition shown in Table 1) to be the tooth portion were stacked in this order, and the resultant was pressed under the conditions of 120° C., 160 seconds and pressing pressure: 4.51 MPa (surface pressure), to prepare a semi-vulcanized preliminarily-molded body (molded body of the tooth portion).

Next, the preliminarily-molded body was mounted on the outer circumference of a cylindrical mold having a tooth shape engraved on the outer circumference thereof, and the pressure sensor was fitted into a predetermined location of the preliminarily-molded body. Next, on its outer circumference, the twisted cord serving as the tension member was spirally spun at a predetermined interval, and further on its circumference, an unvulcanized rubber sheet (a 2.0 mm thick sheet obtained by kneading and rolling the rubber composition shown in Table 1) to be the back portion was wound around, to prepare an unvulcanized stacked body.

Next, the unvulcanized stacked body was placed in a vulcanizer, and vulcanized under the conditions of a temperature of 179° C., a time of 40 minutes, and a vapor pressure of 0.83 MPa to integrate the stacked body, to thereby obtain a vulcanized sleeve of the toothed belt.

Next, the obtained sleeve was cut in a width of 19 mm, to thereby obtain a toothed belt in which the pressure sensor was integrated as a part of the belt.

A power supply, a signal processing circuit, and a wireless transmission circuit for operating the pressure sensor were fixed to the back surface of the toothed belt (not illustrated).

(Running Test of Toothed Belt)

The durability was examined by a running test using the obtained toothed belt of Example. As Comparative Example, a test was also performed on a toothed belt without the pressure sensor (the same configuration as the toothed belt of Example except that the pressure sensor was not disposed).

As a running test device, as illustrated in FIG. 11, a test device including a 21-tooth drive pulley (Dr) and a 42-tooth driven pulley (Dn) around which the toothed belt was wound, and including a tension pulley (Ten) having a diameter of 52 mm capable of abutting on the back portion (back surface), was used. A running test for 1,500 hours was performed under the conditions of an ambient temperature of 120° C., a load of 3.68 kW, an initial tension of 147 N, and a driving-side rotational speed of 7,200 rpm.

Both the toothed belt of Example in which the pressure sensor was disposed and the toothed belt of Comparative Example in which the pressure sensor was not disposed completed the running for 1,500 hours without causing a problem that would be a practical failure phenomenon.

(Sensing Test of Toothed Belt)

A sensing performance (pressure sensor function) of the toothed belt of Example was examined in a layout of the above-described running test device without a tension pulley (Ten).

The pressure sensor was disposed at the above-described position and a signal from the pressure sensor was transmitted through a signal-processing circuit and a wireless transmission circuit disposed on the back surface of the toothed belt. The signal received by the receiver is shown in (A) and (B) of FIG. 12.

(A) and (B) of FIG. 12 show changes in signals when the toothed belt passes through the pulleys (the scales of (A) and (B) of FIG. 12 are the same).

The signal from the pressure sensor was sampled every 30 ms, and data of three samplings were packed and transmitted via 2.4 GHz Zigbee communication. (A) and (B) of FIG. 12 show diagrams in which a signal was received by a reception dongle connected to a USB port of a PC, and serial data from the port was graphed.

(A) of FIG. 12 shows a signal when the toothed belt is running with normal tension. (B) of FIG. 12 shows a signal when the toothed belt is running in a state where the tension is lower than that in the case of (A) of FIG. 12. As can be seen from (A) and (B) of FIG. 12, it can be found from the signal intensity (the magnitude of the signal in the vertical direction) that the belt tension has decreased. This indicates that when monitoring the signal intensity, it is possible to detect that the toothed belt has deteriorated due to abrasion or the like.

Although the present invention has been described in detail with reference to a specific example, it is obvious to those skilled in the art that various changes and modifications can be made without departing from the gist and the scope of the present invention.

The present application is based on Japanese Patent Application No. 2017-242968 filed on Dec. 19, 2017, Japanese Patent Application No. 2017-243510 filed on Dec. 20, 2017, and Japanese Patent Application No. 2018-232408 filed on Dec. 12, 2018, the contents of which are incorporated herein by reference.

REFERENCE SIGNS LIST

1 V belt (power transmission belt)
2 drive pulley
3 driven pulley
4 receiver
10 stacked body
11 tension layer (back surface layer)
12 compression layer (inner surface layer)
302 tooth portion (inner surface layer)
304 back portion (back surface layer)
13 tension member layer
131 tension member
14 upper canvas
15 lower canvas
16 pressure sensor
161, 162 electrode layer
163 piezoelectric layer
17 transmitter
100 system for acquiring pressure data of V belt

The invention claimed is:

1. A power transmission belt configured to be wound around pulleys, the power transmission belt comprising a stacked body comprising:

a back surface layer disposed on a back surface side of the power transmission belt;
an inner surface layer disposed on an inner surface side of the power transmission belt; and
a tension member layer comprising a tension member embedded between the back surface layer and the inner surface layer,
wherein the power transmission belt comprises a plurality of sensors configured to detect a status of the power transmission belt, as at least a part of the stacked body, and
wherein the tension member layer has a composition that is more stress resistant than compositions of the back surface layer and the inner surface layer.

2. The power transmission belt according to claim 1,
wherein the sensors are integrated as at least a part of the stacked body.

3. The power transmission belt according to claim 1,
wherein the sensors are disposed toward the back surface side of the power transmission belt in the inner surface layer and at a center in a width direction of the power transmission belt.

4. The power transmission belt according to claim 1,
wherein the sensors are disposed toward the back surface side of the power transmission belt in the back surface layer and at a center in a width direction of the power transmission belt.

5. The power transmission belt according to claim 1,
wherein the sensors are disposed toward a surface side of the power transmission belt in the inner surface layer to be in contact with a pulley around which the power transmission belt is wound.

6. The power transmission belt according to claim 1,
wherein the stacked body further comprises an outer fabric layer on at least a part of an outer circumference thereof, and
the sensors are included in at least a part of the outer fabric layer.

7. The power transmission belt according to claim 1,
wherein the power transmission belt further comprises a transmission unit configured to transmit status information of the power transmission belt detected by the sensors to an outside, and
the transmission unit is embedded in the back surface layer or in the inner surface layer.

8. The power transmission belt according to claim 1,
wherein each of the sensors is a pressure sensor configured to detect a status of a pressure applied to the power transmission belt.

9. The power transmission belt according to claim 8,
wherein the pressure sensor is a film-shaped piezoelectric body comprising an organic polymer and having a pair of electrodes formed on both surfaces thereof.

10. The power transmission belt according to claim 8,
wherein the pressure sensor has a configuration in which a pair of electrodes is disposed on both surfaces of a piezoelectric body comprising a rubber composition and a piezoelectric powder dispersed therein.

11. The power transmission belt according to claim 1,
wherein the plurality of sensors is disposed at predetermined intervals in a circumferential length direction of the power transmission belt.

12. A status information acquisition system for power transmission belt comprising:
a power transmission belt comprising
a stacked body including a back surface layer disposed on a back surface side of the power transmission belt, an inner surface layer disposed on an inner surface side of the power transmission belt, and a tension member layer comprising a tension member embedded between the back surface layer and the inner surface layer,
a plurality of sensors provided on at least a part of the stacked body and configured to detect a status of the power transmission belt, and
a transmission unit embedded in the back surface layer or in the inner surface layer and configured to transmit status information of the power transmission belt detected by the sensor to an outside; and
a receiver configured to receive the status information of the power transmission belt transmitted from the transmission unit, and
wherein the tension member layer has a composition that is more stress resistant than compositions of the back surface layer and the inner surface layer.

13. The status information acquisition system according to claim 12, wherein the plurality of sensors is disposed at predetermined intervals in a circumferential length direction of the power transmission belt.

* * * * *